United States Patent [19]

Sprangle et al.

[11] 4,370,621
[45] Jan. 25, 1983

[54] HIGH EFFICIENCY GYROTRON OSCILLATOR AND AMPLIFIER

[75] Inventors: Phillip A. Sprangle, Silver Spring, Md.; Robert A. Smith, Washington, D.C.; Kwo R. Chu, Annandale; Michael E. Read, Vienna, both of Va.

[73] Assignee: The United States of America as represented by the Secretary of the Navy, Washington, D.C.

[21] Appl. No.: 129,294

[22] Filed: Mar. 11, 1980

[51] Int. Cl.³ .............................................. H01S 4/00
[52] U.S. Cl. ........................................ 330/4; 330/4.7; 315/5
[58] Field of Search ................... 330/4, 4.7; 315/3, 4, 315/5, 5.35; 328/233

[56] References Cited

U.S. PATENT DOCUMENTS

| 3,398,376 | 8/1968 | Hirshfield | 315/5 |
| 3,463,959 | 8/1969 | Jory et al. | 315/5 |
| 4,143,299 | 3/1979 | Sprangle et al. | 328/233 |
| 4,215,291 | 7/1980 | Friedman | 328/233 |
| 4,224,576 | 9/1980 | Granatstier et al. | 330/4 |

OTHER PUBLICATIONS

Sprangle et al, "The Linear . . . Cyclotron Maser Instability", 6/77, pp. 528-544, IEEE Trans. of Microwave Theory & Tech., vol. MTT25.
Chu et al., "Calculation of Optimum . . . Wave Amplifier", 10/77, pp. 1-28, NTIS AD-A049.
Barnett, "Cyclotron Maser Instability . . . Field", 6/78, pp. 1-98, Univ. of Tenn. Phd Thesis 7823306.
Chu et al., "Methods of Efficiency . . . Gyrotron Oscillator", 9/20/79, pp. 1-29, NTIS Report AD-A075 133/9, G-222.
Chu et al., "Characteristics . . . Gyrotron Traveling Wave Amplifier", 2/79, pp. 178-187, IEEE Trans. Microwave Theory & Tech. (USA), vol. MTT-27.
Hirshfield, "The Electron Cyclotron Maser", 6/77, pp. 522-527, IEEE Trans. of Microwave Theory and Tech., vol. MTT25, #6.
Chu, "Comparative Study of Axial . . . Cyclotron Instabilities", 11/11/77, Amer. Phys. Soc. Plasma Div. Meeting, A774018, Georgia.
Sprangle et al., "The Non-Linear Theory . . . Maser", 4/18/79, pp. 1-23, NRL Memo. Report 3983.
Moiseev, "Maximum Amplification Bond . . . Twistron", 8/77, pp. 846-849, IRIR, vol. 20, #8.
Read et al., "Study . . . Millimeter Wave Sources", 3/79, pp. 1-52, Jaycor Project 2061, ADA063387.

Primary Examiner—Nelson Moskowitz
Attorney, Agent, or Firm—Robert F. Beers; William T. Ellis; Alan P. Klein

[57] ABSTRACT

An electron cyclotron maser high-frequency generator/amplifier having a cavity resonator positioned in an axial magnetic field. A spiralling beam of relativistic electrons is injected into the cavity and stimulated emission of radiation by the electrons takes place at the frequency of a wave mode supported by the cavity resonator. The transverse efficiency, defined as the average electron energy loss divided by its initial transverse energy, is maximized by disposing a shaped iron collar about the cavity resonator to provide an axial magnetic field in the cavity resonator whose amplitude increases in the beam direction-of-travel. In an alternative embodiment, the transverse efficiency is maximized by tapering the inner wall of the cavity in the axial direction to provide a wave-mode in the cavity resonator whose electric-field amplitude increases in the beam direction-of-travel.

5 Claims, 5 Drawing Figures

HIGH EFFICIENCY GYROTRON OSCILLATOR AND AMPLIFIER

BACKGROUND OF THE INVENTION

The present invention relates to an apparatus for generating microwave and millimeter wave radiation by stimulating the coherent emission of cyclotron radiation from a beam of free electrons.

The relativistic electron cylotron master (commonly called a gyrotron) is a microwave device based on the cyclotron maser interaction between an electromagnetic wave and an electron beam in which the individual electrons move along helical trajectories in the pressure of an applied magnetic field. In the gyrotron oscillator the electron beam sustains a constant-amplitude normal-mode oscillation in an open-end cavity.

The primary motivation for achieving a high-efficiency gyrotron is connected with its application in controlled-fusion research. To reach the fusion ignition temperature, a great amount of energy (many megajoules) has to be injected for plasma heating. Furthermore, this should be done with the maximum efficiency in order to alleviate the energy break-even condition. A highly efficient gyrotron has been recognized as one of the most promising sources to meet these requirements.

Two commonly used definitions of efficiency need to be distinguished. The overall efficiency ($\eta$) is defined as the average electron-energy loss divided by its total initial energy, and the transverse efficiency ($\eta_\perp$) is the same quantity divided by the initial transverse energy.

Many methods for efficiency enhancement have so far been considered. However, in the past, the maximum transverse efficiency was limited to about 40 percent.

SUMMARY OF THE INVENTION

It is therefore one object of the present invention to improve a relativistic electron cyclotron maser.

It is another object of the present invention to enhance, in a relativistic electron cyclotron maser, the efficiency of energy-transfer from the transverse motion of the electrons to an electromagnetic wave.

The object of the present invention are achieved by incorporating efficiency-enhancement means in a relativistic electron cyclotron maser. The cyclotron maser has a cavity resonator positioned in an axial magnetic field to receive a spiralling beam of electrons. The cyclotron maser produces stimulated emission of radiation by the electrons at the frequency of a wave mode supported by the cavity resonator. The beam of electrons passes through a phase-bunching region and an energy extraction region in the cavity resonator. The efficiency enhancement means functions to set a bunching parameter $\alpha$ much less than unity in the phase-bunching region of the cavity resonator to maximize the phase-bunching of the electrons in the beam, and to cause the bunching parameter to increase in the energy extraction region of the cavity resonator so that the bunched electrons in the beam reach their minimum energies at the same time. In the disclosed relativistic electron cyclotron maser the maximum efficiency of energy transfer from the transverse motion of the electrons to an electromagnetic wave mode within the cavity can be as much as 100 percent.

The foregoing, as well as other objects, features and advantages of the present invention will become more apparent from the following detailed description when taken in conjunction with the appended drawings.

BRIEF DESCRIPTION OF THE DRAWINGS

FIG. 1b is a plot of typical variation in strength of a magnetic field B longitudinal with respect to the apparatus of FIG. 1a.

FIG. 2b is a plot of typical variation in strength of magnetic field B longitudinal with respect to the apparatus of FIG. 2a.

DESCRIPTION OF THE PREFERRED EMBODIMENTS

Figure 1A:
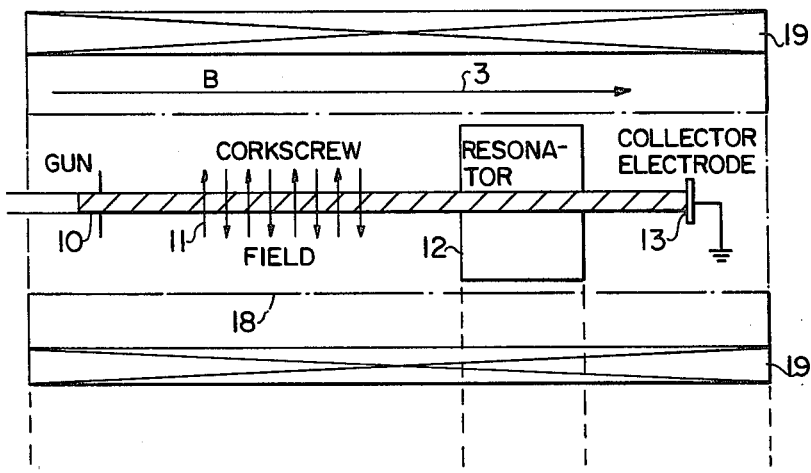
FIG. 1a is an illustrative diagrammatic view of a typical prior-art relativistic electron cyclotron maser.

FIG. 1a is a diagrammatic view of a conventional relativistic electron cyclotron maser. Cyclotron masers of this type are well known to those skilled in the art. The particular cyclotron maser illustrated in the drawing is disclosed in U.S. Pat. No. 3,398,376 which was issued to J. L. Hirshfield on Aug. 20, 1968, although the present invention is applicable to virtually any type of relativistic electron cyclotron maser having the general configuration illustrated.

Figure 1B:
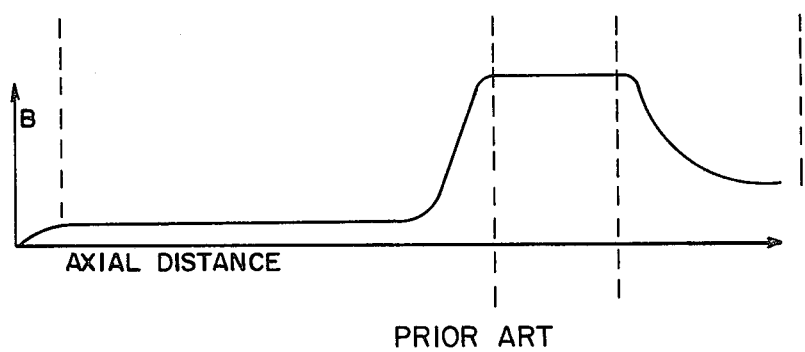

Referring again to FIG. 1a, the cyclotron maser shown employs an evacuated tube 18 surrounded by means such as solenoidal windings 19 for producing an axial magnetic field B whose direction is indicated by an arrow 3. FIG. 1b shows the variation of the magnetic field B along the axis of the tube 18. A relativistic electron beam source is axially disposed within the tube 18. While the source may take a variety of forms, it may conveniently take the form illustrated of an electron gun 10 and a twisted transverse magnetic field whose direction is indicated by arrows 11, called a corkscrew, for producing an axial beam of spiralling electrons. The electrons cross the magnetic hill shown in FIG. 1b into a microwave cavity resonator 12 with most of their kinetic energy transverse to the axial magnetic field. In the resonator 12, the electrons drift through a uniform region of the axial magnetic field, shown in FIG. 1b, whose value is selected such that the cyclotron frequency of the electrons entering the cavity, i.e., the frequency of rotation of the individually spiralling electrons in the beam, is slightly lower (by a few percent) than the frequency of the electromagnetic wave mode within the cavity. In a classical picture, a net transfer of energy from the transverse motion of the electrons to the electromagnetic wave mode results from phase-bunching of the electrons in their cyclotron orbits. The electrons, which are initially randomly phased upon entering the resonator, become bunched in phase after drifting through a phase-bunching region of the resonator. Phase-bunching occurs because the cyclotron frequency depends on the relativistic electron mass. Electrons that absorb energy from the cavity fields become heavier and slip back in phase; conversely, those that lose energy advance in phase. Following the phase-bunching region, the electrons pass into an energy-extraction region of the resonator where the phase of the electrons and that of the cavity fields favors deceleration of the bunched electrons. The bunched electrons are kept decelerating by the cavity fields, and, losing their kinetic energy, they transfer this energy to the electromagnetic wave mode within the cavity. Following the resonator 12, the electrons are collected at a water-cooled electrode 13.

Figure 1C:
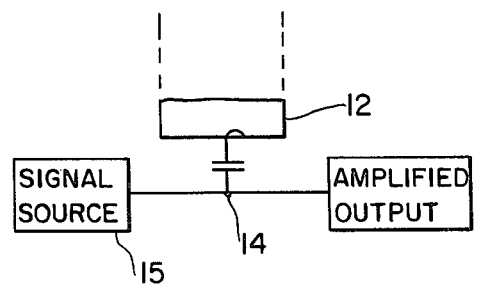
FIG. 1c is a partial view indicating the use of the apparatus of FIG. 1a as an amplifier.

The apparatus illustrated in FIG. 1a can also be employed as an amplifier. For this purpose, the microwave cavity 12 is connected to one arm of a circulator 14. Amplification of microwave power from a signal source 15 reflected from the cavity resonator 12 is then observed in the other T leg. FIG. 1c illustrates this modification.

In the prior-art relativistic electron cyclotron masers as typified by the above-mentioned patent, the maximum intrinsic efficiency of energy transfer from the transverse motion of the electrons to an electromagnetic wave ($\eta \perp$) is at most 40 percent.

Before entering into the detailed description of preferred embodiments of the present invention according to accompanying FIGS. 2a, 2b and 3 of the drawing, the theory of the present invention will be explained hereinafter. A bunching parameter $\alpha$ can be defined as a function of axial coordinate in the resonator:

$$\alpha = \frac{\epsilon c}{2r_o \Delta \omega}$$

wherein:
  $\epsilon$ = the dimensionless ratio of the cavity-wave-mode, electric field amplitude E to the magnetic field amplitude B at the entrance to the resonator.
  c = speed of light ($2.998 \times 10^{10}$ cm/sec)
  $r_o$ = Larmor radius of the electrons at the entrance to the resonator, in cm.
  $\Delta \omega$ = frequency mismatch between the Doppler-shifted cavity wave mode and the cyclotron frequency of the electrons, in sec$^{-1}$.

Reference may be had to NTIS Publication ADA 069461 entitled "The Non-Linear Theory of Efficiency Enhancement in the Electron Cyclotron Maser", herein incorporated by reference, where it is shown that the maximum intrinsic efficiency of energy transfer from the transverse motion of the electrons to the electromagnetic wave mode in the cavity ($\eta \perp$) can be dramatically increased by:

(1) making $\alpha << 1$ in the phase-bunching region to maximize the bunching of electrons in phase space; and then (2) increasing $\alpha$ in the energy-extraction region to a value of the order of unity so that all of the bunched electrons reach their minimum energies at the same time. This can be accomplished either by:

(1) providing an axial magnetic field B whose amplitude in the cavity resonator increases in the beam direction-of-travel across the resonator (to make $\Delta \omega$, which depends on B through the cyclotron frequency, a decreasing function of axial coordinate); or (2) providing an electromagnetic wave mode supported by the cavity resonator whose electric-field amplitude increases in the beam direction-of-travel across the resonator (to make $\epsilon$ an increasing function of axial coordinate).

Figure 2A:
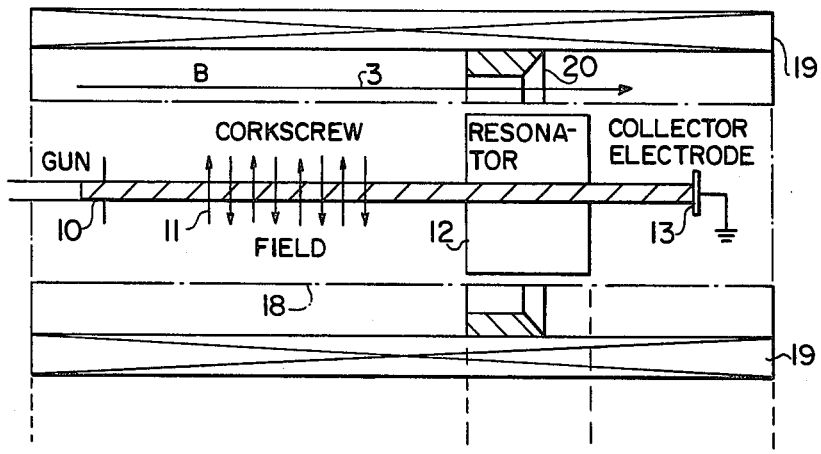
FIG. 2a is an illustrative diagrammatic view of a first embodiment of the invention.

FIG. 2a is a diagrammatic view of a first embodiment of a relativistic electron cyclotron maser according to the principles of the present invention. A number of the structural components depicted in FIG. 2a may be identical to elements previously described above. For ease of comparison, these components are identified in FIG. 2a with the same reference numerals as employed above. These components include evacuated tube 18, magnetic field producing means such as solenoid windings 19, a relativistic electron beam source such as electron gun 10 and corkscrew field 11, microwave cavity resonator 12, and water-cooled electrode 13. It is noted that the features and structure of these components form no part of the present invention and further details thereof can be found in the above-mentioned U.S. Pat. No. 3,398,376 whose disclosure is herewith incorporated by reference. In accordance with the invention, the axial magnetic field B is caused to increase in the cavity in the beam direction by known methods such as the interposition of iron circuits or by varying the number of solenoid windings per unit length. A specific illustrative structure for accomplishing this is shown in FIG. 2a and comprises a shaped iron collar 20 that encircles the cavity resonator 12. Iron collar 20 reduces the magnetic field B in the resonator due to the magnetic shielding provided by the permeable material of the collar. The inner radius of the collar 20 is tapered so that B is small near the beam entrance plane and large near the beam output plane. The plot of FIG. 2b of the drawing shows the axial variation of the DC magnetic field B of FIG. 2a. The magnetic field profile is an example taken from the above-referenced NTIS publication ADA 069461 and is merely illustrative of one manner of varying the magnetic field B. It is to be understood that the magnetic field can be varied in any manner such that B increases in the beam direction-of-travel across the cavity resonator.

Figure 3:
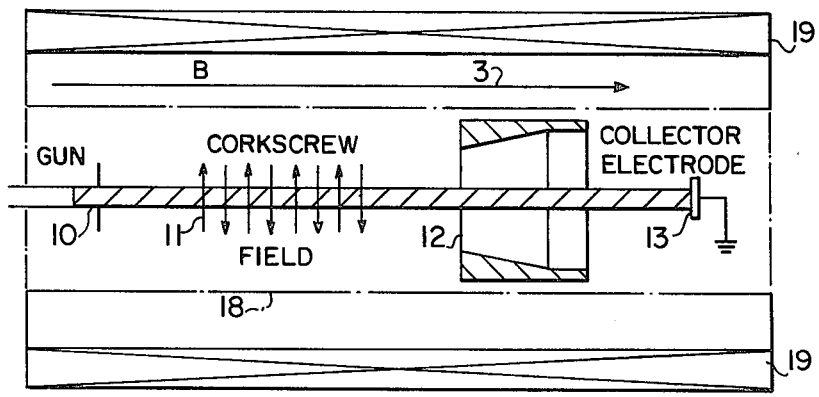
FIG. 3 is an illustrative diagrammatic view of a second embodiment of the invention.

FIG. 3 is a diagrammatic view of a second embodiment of the relativistic electron cyclotron maser according to the principles of the present invention. Again, structural components which are identical to elements previously described are identified with the same reference numerals as employed above. In accordance with the invention, the electric-field amplitude E of the wave mode supported by the cavity resonator 12 is caused by known methods to increase in the beam direction-of-travel across the resonator. A specific illustrative structure for accomplishing this is shown in FIG. 3 and comprises substituting for resonator 12 a cavity which has an inner wall whose radius is tapered in the axial direction such that E is small near the beam entrance plane and large near the beam output plane.

The specific details of the manner of otherwise constructing the iron collar 20 or the tapered cavity 12 form no part of the invention itself and are within the level of ordinary skill in the art.

Figure 2B:
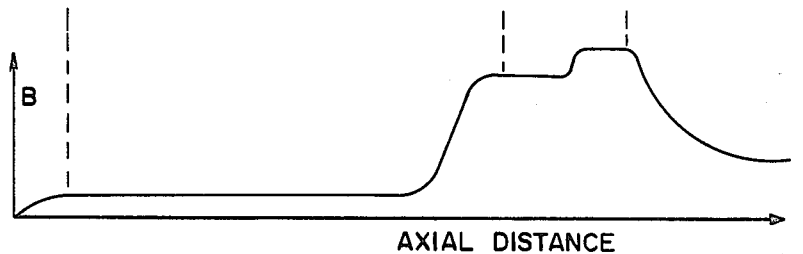

In the embodiments of the present invention illustrated in FIGS. 2a, 2b and 3, the variation of the magnetic field B and the wave mode electric-field amplitude E are such as to make $\alpha << |$ in the phase-bunching region, and to increase $\alpha$ in the energy-extraction region, so that the maximum intrinsic efficiency of energy transfer from the transverse motion of the electrons to the electromagnetic wave mode within the cavity can be dramatically increased to as much as 100 percent. Reference may be had to the above-referenced NTIS Publication ADA 069461 for further mathematical analysis. In particular, it is shown in that reference for a model where $\alpha$ is made equal to 0.077 in the phase-bunching region, and increased to a value of 0.31 in the energy extraction region, one obtains a theoretical transverse efficiency of 75 percent.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. In a relativistic electron cyclotron maser having a cavity resonator positioned in an axial magnetic field to receive therethrough a spiralling beam of electrons for producing stimulated emission of radiation by the electrons at the frequency of a wave mode supported by the cavity resonator, the beam of electrons passing through a phase-bunching region and an energy extraction region in the cavity resonator, efficiency-enhancement means for setting a bunching parameter $\alpha$ to a value much less than unity in the phase-bunching region of the cavity resonator to maximize the phase-bunching of electrons in the beam, and for causing the bunching parameter $\alpha$ to increase in the energy-extraction region of the cavity resonator so that the bunched electrons in the beam reach their minimum energies at the same time, wherein the bunching parameter $$\alpha = \frac{\epsilon c}{2r_o \Delta\omega}$$

and wherein:

$\epsilon$ = dimensionless ratio of the cavity-wave-mode, electric field amplitude E to the magnetic field amplitude B at the entrance to the resonator $c$ = speed of light ($2.998 \times 10^{10}$ cm sec$^{-1}$)

$r_o$ = Larmor radius of the electrons at the entrance to the resonator in cm.

$\Delta\omega$ = frequency mismatch between the Doppler-shifted cavity wave mode and the cyclotron frequency of the electrons, in sec$^{-1}$.

2. The relativistic electron cyclotron maser recited in claim 1 wherein the efficiency enhancement means includes:

means for producing in the cavity resonator an axial magnetic field whose amplitude increases in the beam direction-of-travel across the resonator.

3. The relativistic electron cyclotron maser recited in claim 2 wherein the magnetic field-producing means includes:

a shaped iron collar encircling the cavity resonator.

4. The relativistic electron cyclotron maser recited in claim 1 wherein the efficiency enhancement means includes:

means for providing in the cavity resonator a wave mode electric field whoses amplitude increases in the beam direction-of-travel across the resonator.

5. The relativistic electron cyclotron maser recited in claim 4 wherein the electric field providing means includes:

an inner wall of the cavity resonator tapered in the axial direction.

* * * * *